(12) United States Patent
Wolfe et al.

(10) Patent No.: US 7,178,870 B2
(45) Date of Patent: Feb. 20, 2007

(54) SEAT LOAD SENSING APPARATUS

(75) Inventors: George B. Wolfe, Plymouth, MI (US); Nick L. Smith, Southfield, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 96 days.

(21) Appl. No.: 11/057,455

(22) Filed: Feb. 14, 2005

(65) Prior Publication Data

US 2006/0181119 A1 Aug. 17, 2006

(51) Int. Cl.
*A47C 7/62* (2006.01)

(52) U.S. Cl. .................. 297/217.2; 280/735
(58) Field of Classification Search ............ 297/217.2; 280/735
See application file for complete search history.

(56) References Cited

U.S. PATENT DOCUMENTS

| | | | |
|---|---|---|---|
| 5,502,284 A | | 3/1996 | Meiller et al. |
| 5,573,269 A | | 11/1996 | Gentry et al. |
| 5,739,757 A | * | 4/1998 | Gioutsos ............... 280/735 X |
| 5,810,392 A | * | 9/1998 | Gagnon .................. 280/735 |
| 5,877,677 A | | 3/1999 | Fleming et al. |
| 5,942,695 A | * | 8/1999 | Verma et al. ........... 280/735 X |
| 5,971,432 A | * | 10/1999 | Gagnon et al. ........... 280/735 |
| 5,984,349 A | * | 11/1999 | Van Voorhies ............ 280/735 |
| 5,987,370 A | | 11/1999 | Murphy et al. ........... 280/735 |
| 6,039,344 A | | 3/2000 | Mehney et al. |
| 6,056,079 A | * | 5/2000 | Cech et al. ........... 297/217.2 X |
| 6,087,598 A | * | 7/2000 | Munch .................. 280/735 X |
| 6,101,436 A | | 8/2000 | Fortune et al. |
| 6,129,168 A | * | 10/2000 | Lotito et al. ........... 280/735 X |
| 6,161,891 A | * | 12/2000 | Blakesley ............ 280/735 X |
| 6,170,866 B1 | | 1/2001 | Popp et al. |
| 6,283,504 B1 | * | 9/2001 | Stanley et al. ............ 280/735 |
| 6,323,433 B1 | | 11/2001 | Mahaney et al. |
| 6,323,444 B1 | | 11/2001 | Aoki |
| 6,342,683 B1 | | 1/2002 | Aoki et al. |
| 6,401,855 B1 | | 6/2002 | Wolfe .................. 280/735 |
| 6,407,347 B1 | * | 6/2002 | Blakesley ............ 280/735 X |
| 6,419,315 B1 | * | 7/2002 | Hiemstra .............. 280/735 X |
| 6,476,514 B1 | | 11/2002 | Schondorf |
| 6,508,514 B2 | | 1/2003 | Wolfe |

(Continued)

*Primary Examiner*—Rodney B. White
(74) *Attorney, Agent, or Firm*—Tarolli, Sundheim, Covell & Tummino LLP

(57) ABSTRACT

An apparatus (10) is used in a vehicle having a seat (2) for a vehicle occupant and a vehicle floor pan (4) for supporting the vehicle seat (2). The apparatus (10) includes a vehicle seat frame (20), a bracket (30), a spring element (240, 340 or 340, 350), a lever (90), and a sensor (992). The spring element (240, 340 or 340, 350) compresses to allow the vehicle seat frame (20) to move vertically when the load of the vehicle occupant acts on the vehicle seat (2). The lever (90) has a first end portion (100) and a second end portion (110) opposite the first end portion (100). The first end portion (100) is movable with the vehicle seat frame (20). The second end portion (110) is movable with the vehicle seat frame (20). The lever (90) has a middle portion (120) interposed between the first end portion (100) and the second end portion (110). The lever (90) bends as the vehicle seat frame (20) moves vertically relative to the bracket (30). The sensor (992) detects movement of the middle portion (120) of the lever (90) and provides an output signal indicative of the amount of movement of the middle portion (120) of the lever (90).

20 Claims, 5 Drawing Sheets

U.S. PATENT DOCUMENTS

| | | | |
|---|---|---|---|
| 6,559,392 B1 | 5/2003 | Haynes et al. | 280/735 |
| 6,617,531 B1 | 9/2003 | Aoki | |
| 6,670,560 B2 * | 12/2003 | Curtis | 280/735 X |
| 6,739,206 B2 | 5/2004 | Ishida | |
| 6,774,804 B2 | 8/2004 | Sakai et al. | |
| 6,916,997 B2 * | 7/2005 | Thakur et al. | 280/735 X |
| 6,975,239 B2 * | 12/2005 | Young et al. | 280/735 X |
| 6,981,717 B2 * | 1/2006 | Sakamoto et al. | 280/735 |
| 6,994,397 B2 * | 2/2006 | Young et al. | 297/217.2 |
| 7,021,707 B2 * | 4/2006 | Young et al. | 297/217.2 |
| 7,026,946 B2 * | 4/2006 | Saunders et al. | 280/735 X |
| 7,032,968 B2 * | 4/2006 | Sakai et al. | 297/217.2 |
| 7,034,709 B2 * | 4/2006 | Young et al. | 280/735 X |
| 2002/0053980 A1 | 5/2002 | Masuda et al. | |
| 2002/0063419 A1 | 5/2002 | Susko | |
| 2002/0063630 A1 | 5/2002 | Curtis et al. | |
| 2003/0177839 A1 | 9/2003 | Tsukada et al. | |
| 2004/0045759 A1 | 3/2004 | Kiribayashi | |
| 2004/0090338 A1 | 5/2004 | Nishino et al. | |
| 2004/0135355 A1 | 7/2004 | Selig et al. | |
| 2004/0135697 A1 | 7/2004 | Sakai et al. | |
| 2004/0159485 A1 | 8/2004 | Sakai et al. | |
| 2004/0263154 A1 * | 12/2004 | Young et al. | 324/207.2 |
| 2006/0061159 A1 * | 3/2006 | Steele | 297/217.2 |
| 2006/0087164 A1 * | 4/2006 | Young et al. | 297/217.2 |
| 2006/0103192 A1 * | 5/2006 | Norton | 297/217.2 |

* cited by examiner

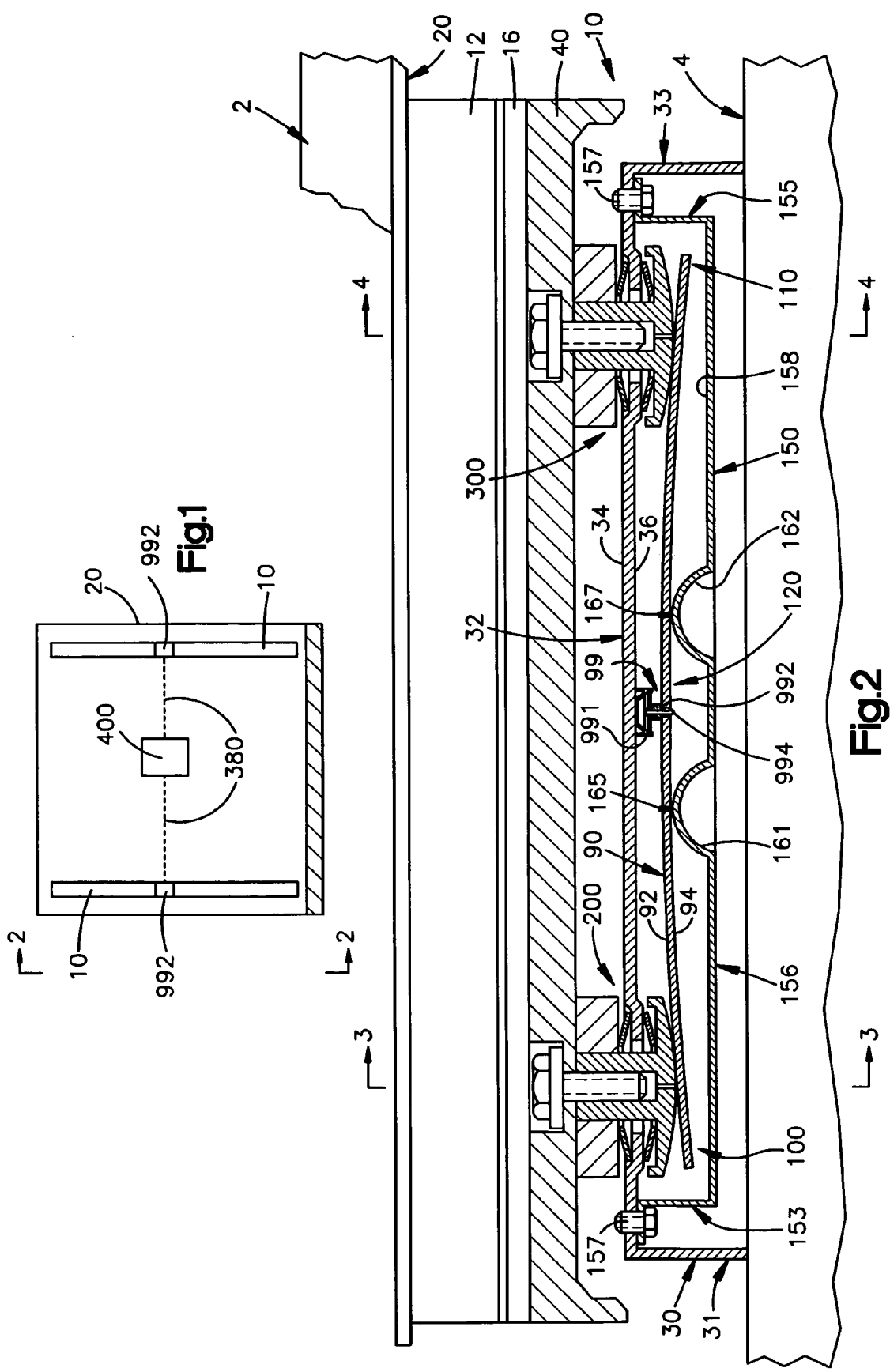

SEAT LOAD SENSING APPARATUS

TECHNICAL FIELD

The present invention relates to an apparatus for sensing a load, and more particularly, to an apparatus for sensing the load imparted to a vehicle seat by a vehicle occupant.

BACKGROUND OF THE INVENTION

A conventional vehicle occupant load sensing apparatus includes a load sensor placed between a corner of a vehicle seat frame and a support mount for the seat. The sensor is directly within the vertical load path of the occupant's weight and responds to the vertical loads imparted to the seat by the occupant of the seat. In addition, the sensor may respond to torque loads between the seat and the support mount. Since the seat frame and the support mount must withstand large torque loads (i.e., tilting of the seat frame during crash conditions), typically the sensor also must be constructed to withstand large torque loads.

This construction exposes the sensor to large dynamic loads over short periods of time, such as during a collision to the vehicle. Thus, the sensor may not produce a reliable vertical load output signal subsequent to such a dynamic loading event.

A load sensing apparatus which mitigates such dynamic loading during such a dynamic loading event would eliminate the requirement of replacing the load sensing apparatus subsequent to the dynamic loading event. Also, a load sensing apparatus which has fewer electrical components than the conventional apparatus would lower cost.

SUMMARY OF THE INVENTION

An apparatus in accordance with the present invention is used in a vehicle having a seat for a vehicle occupant and a vehicle floor pan for supporting the vehicle seat. The apparatus includes a vehicle seat frame a bracket, a spring element, a lever, and a sensor. The vehicle seat frame supports a load of the vehicle occupant in the vehicle seat. The bracket transmits the load of the vehicle occupant in the vehicle seat from the vehicle seat frame to the vehicle floor pan. The spring element compresses to allow the vehicle seat frame to move vertically when the load of the vehicle occupant acts on the vehicle seat. The lever has a first end portion and a second end portion opposite the first end portion. The first end portion is movable with the vehicle seat frame. The second end portion is movable with the vehicle seat frame. The lever has a middle portion interposed between the first end portion and the second end portion. The lever bends as the vehicle seat frame moves vertically relative to the bracket. The sensor detects movement of the middle portion of the lever and provides an output signal indicative of the amount of movement of the middle portion of the lever.

Another apparatus in accordance with the present Tinvention is used in a vehicle having a seat for a vehicle occupant and a vehicle floor pan for supporting the vehicle seat. The apparatus includes a bracket, a spring element, a lever, and a sensor. The bracket transmits the load of the vehicle occupant in the vehicle seat to the vehicle floor pan. The spring element compresses to allow the vehicle seat to move vertically when the load of the vehicle occupant acts on the vehicle seat. The lever has a first end portion and a second end portion opposite the first end portion. The first end portion is movable with the vehicle seat. The second end portion is movable with the vehicle seat. The lever has a middle portion interposed between the first end portion and the second end portion. The lever bends as the vehicle seat moves vertically relative to the bracket. The sensor detects movement of the middle portion of the lever and provides an output signal indicative of the amount of movement of the middle portion of the lever. An alternatiave sensor may detect force applied to the sensor by the middle portion of the lever and provide an output signal indicative of the amount of that force.

Still another apparatus in accordance with the present invention is used in a vehicle having a seat for a vehicle occupant and a vehicle floor pan for supporting the vehicle seat. The apparatus includes a vehicle seat frame, a spring element, a lever, and a sensor. The vehicle seat frame supports a load of the vehicle occupant in the vehicle seat. The spring element compresses to allow the vehicle seat frame to move vertically when the load of the vehicle occupant acts on the vehicle seat. The lever has a first end portion and a second end portion opposite the first end portion. The first end portion is movable with the vehicle seat frame. The second end portion is movable with the vehicle seat frame. The lever has a middle portion interposed between the first end portion and the second end portion. The lever bends as the vehicle seat frame moves vertically relative to the vehicle floor pan. The sensor detects movement of the middle portion of the lever and provides an output signal indicative of the amount of movement of the middle portion of the lever.

BRIEF DESCRIPTION OF THE DRAWINGS

The foregoing and other features of the invention will become more apparent to one skilled in the art upon consideration of the following description of the invention and the accompanying drawings, in which:

FIG. 1 is a schematic representation of an apparatus in accordance with the present invention;

FIG. 2 is a schematic representation of the apparatus of FIG. 1 taken along line 2—2 of FIG. 1;

DESCRIPTION OF AN EXAMPLE EMBODIMENT

Figure 3:
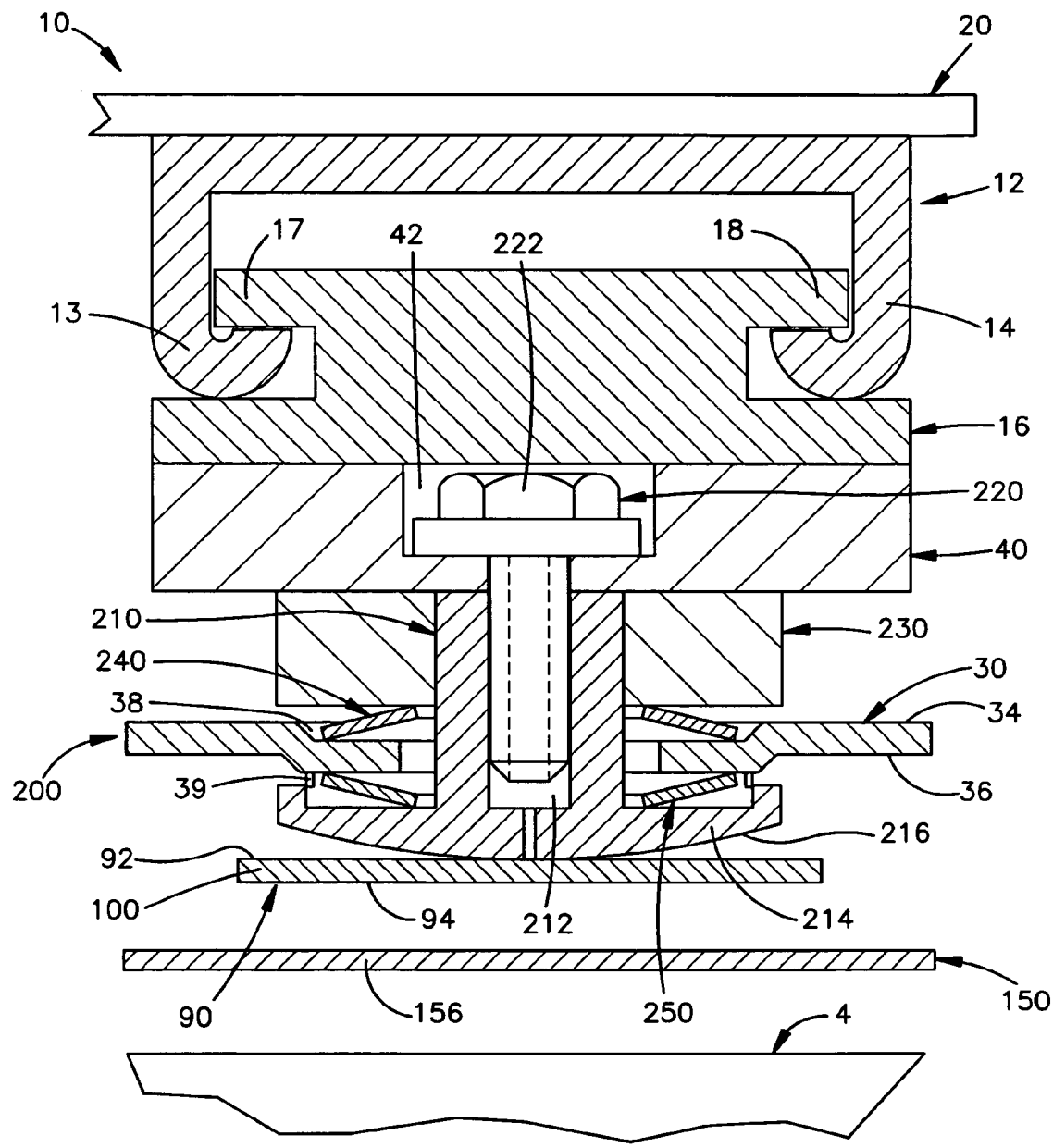
FIG. 3 is a schematic representation of the apparatus of FIG. 2 taken along line 3—3 of FIG. 2.
Figure 4:
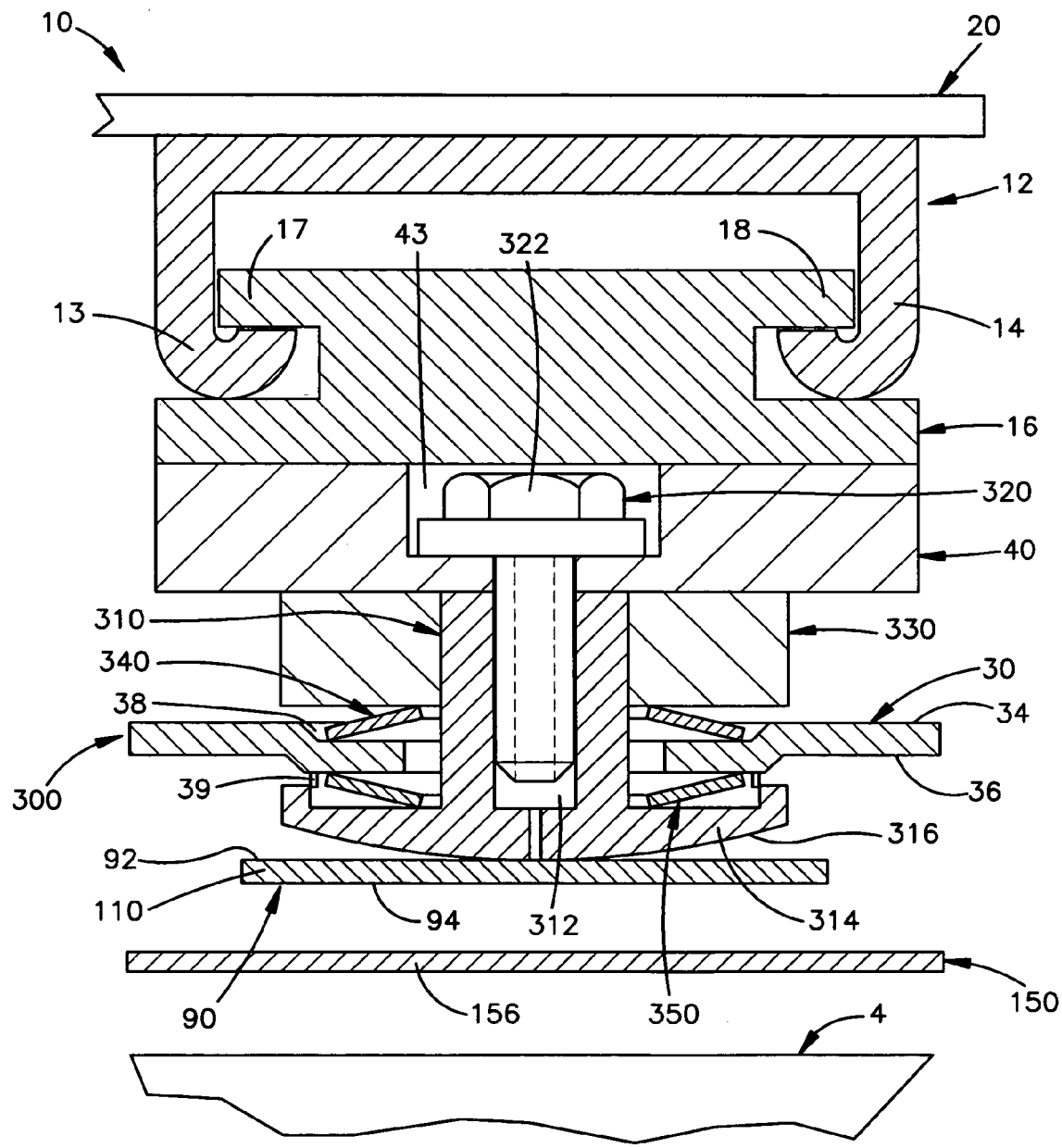
FIG. 4 is a schematic representation of the apparatus of FIG. 2 taken along line 4—4 of FIG. 2.

According to an example embodiment of the present invention, as shown in FIGS. 1–4, a vehicle occupant load sensing apparatus 10 is used in a vehicle having a seat 2 for the vehicle occupant. A vehicle floor pan 4 supports the vehicle seat 2.

The apparatus 10 includes a vehicle seat frame 20 for supporting the vehicle seat 2, an upper track 12 for supporting the vehicle seat frame, a lower track 16 for adjustably supporting the upper track, a base rail 40 for supporting the lower track 16, two active spring assemblies 200, 300, a generally rectangular lever 90, a sensor assembly 99, a bracket 30 for supporting the two active spring assemblies 200, 300, and a carrier member 150 for supporting the rectangular lever 90 and the sensor assembly 99. Each active spring assembly 200, 300 is placed adjacent a corner of the vehicle seat 2 (FIG. 1)

The vehicle seat frame 20 supports a weight load of the vehicle occupant in the vehicle seat 2. During a vehicle collision, the vehicle seat frame 20 may also sustain upward and lateral loads created by the vehicle collision. The load of the vehicle occupant in the vehicle seat 2 is transmitted through the upper track 12, the lower track 16, and the base rail 40 from the vehicle seat frame 20 through the bracket 30 to the vehicle floor pan 4.

The bracket 30 is fixedly attached to the vehicle floor pan 4 in a suitable manner. The lower track 16 has two opposite side rails 17, 18. The upper track 12 has two opposite rails 13, 14 that slidingly engage the side rails 17, 18 of the lower track 16. The upper track 12 may slide on the lower track 16 for manual forward or rearward adjustment of the position of the seat 2 for occupants of varying sizes, as is known in the art. The vehicle seat frame 20 is thus supported by the upper track 12 for loads applied to the vehicle seat 2.

The bracket 30 is typically constructed of a suitable metal such as steel. The bracket 30 has two generally vertical end portions 31, 33 for fixed connection to the vehicle floor pan 4. The bracket 30 also has a horizontal portion 32 for supporting the two active spring systems and the sensor assembly 99. The end portions 31, 33 of the bracket 30 support the carrier member 150. The carrier member 150 supports the rectangular lever 90. The carrier member 150 is attached to the bracket 30 by two fasteners 157, such as bolts.

The horizontal portion 32 of the bracket 30 has an upper surface 34 and a lower surface 36 opposite the upper surface. The upper surface 34 of the horizontal portion 32 has two circular recesses 38 for securing parts of the two active spring assemblies 200, 300. The lower surface 36 has two annular projections 39 for securing parts of the two active spring assemblies 200, 300.

The flexibility of the active spring assemblies allows relative vertical movement between the vehicle seat frame 20 and the bracket 30 when a vertical load is placed on the vehicle seat 2. The carrier member 150 for vertically supports the lever 90. The lever 90 is thus deflected about the two hemispherical portions 152, 154 in an amount proportional to the vertical load applied to the vehicle seat frame 20. The lever 90 is prestressed so that when no load is placed on the vehicle seat frame 20, the lever has a concave downward shape (FIG. 2).

The lever 90 has a first end portion 100, a second end portion 110 opposite the first end portion, and a middle portion 120 interposed between the first end portion and the second end portion. The lever 90 has an upper surface 92 and a lower surface 94 opposite the upper surface. The lever 90, typically an elastic metal such as stainless steel or aluminum, bends as the seat frame 20 moves vertically relative to the bracket 30. The sensor assembly 99 may be any suitable assembly that can sense the vertical movement of the middle portion 120 of the lever 90.

The carrier member 150 is typically constructed of a suitable metal such as steel. The carrier member 150 has a first end portion 153, a second end portion 155 opposite the first end portion, and a middle portion 156 interposed between the first end portion and the second end portion. The middle portion 156 has a horizontal surface 158 with two cylindrical portions 161, 162 for vertically supporting the lever. Each cylindrical portion 161, 162 has a vertical pin 165, 167 for engaging a corresponding bore in the lever 90.

The pins 165, 167 and bores are sized such that the lever 90 may rotate about the cylindrical portions 161, 162 when the lever 90 deflects.

The first active spring assembly 200 (FIG. 3) includes a threaded sleeve 210, a fastener 220, a spacer 230, an upper clover, or dome, spring 240, a lower clover, or dome, and spring 250. The fastener 220 secures the spacer 230, the upper spring 240, the bracket 30, and the lower spring 250 between the base rail 40 and the threaded sleeve 210. The upper and lower springs 240, 250 are compressed in this arrangement even without a load being placed on the vehicle seat frame 20.

A head portion 222 of the fastener 220 is secured in a recess 42 of the base rail 40 so that the lower track 16 may lie flush against the base rail 40. The threaded sleeve 210 has a threaded bore 212 for receiving the fastener 220 and a flange 214 for engaging the upper surface 92 of the first end portion 100 of the lever 90. The flange 214 has a spherical surface 216 allowing only vertical displacement to be translated to the first end portion 100 of the lever 90 (i.e., no torque loads, etc.).

The second active spring assembly 300 (FIG. 4) includes a threaded sleeve 310, a fastener 320, a spacer 330, an upper clover, or dome, spring 340, and a lower clover, or dome, spring 350. The fastener 320 secures the spacer 330, the upper spring 340, the bracket 30, and the lower spring 350 between the base rail 40 and the threaded sleeve 310. The upper and lower springs 340, 350 are compressed in this arrangement even without a load being placed on the vehicle seat frame 20.

A head portion 322 of the fastener 320 is secured in a recess 43 of the base rail 40 so that the lower track 16 may lie flush against the base rail 40. The threaded sleeve 310 has a threaded bore 312 for receiving the fastener 320 and a flange 314 for engaging the upper surface 92 of the second end portion 110 of the lever 90. The flange 314 has a spherical surface 316 allowing only vertical displacement to be translated to the second end portion 110 of the lever 90 (i.e., no torque loads, etc.).

The sensor assembly 99 is attached to the lower surface 36 of the horizontal portion 32 of the bracket 30. The sensor assembly 99 is positioned to engage the middle portion 120 of the lever 90 at a midway point between the first end portion 100 and the second end portion 110. The sensor assembly 99 includes a sensor holder 991 and a sensor 992. The sensor holder 991 attaches to the bracket 30 in a suitable manner and secures the sensor 992. The sensor 992 has a projection 994 for engaging an aperture in the middle portion 120 of the lever 90. The projection 994 and aperture are sized such that the lever 90 may rotate about the projection 994 of the sensor 992 when the lever 90 deflects. If a non-uniform vertical load is placed on the vehicle seat frame 20, the middle portion 120 of the lever 90 may bend unequally about the projection 994 (i.e., asymmetric loading of the vehicle seat frame, etc.).

When a downward load is placed on the seat frame 20 (FIG. 5), the upper springs 240, 340, already compressed, are further compressed against the spacers 230, 330 and the bracket 30. The lower springs 250, 350, already compressed, expand against the bracket 30 and the flanges 214, 314 of the threaded sleeves 210, 310. The vehicle seat frame 20 is thus displaced downward. The spacers 230, 330 engage the upper surface 34 of the bracket 30 to provide a limit on downward movement of the vehicle seat frame 20.

Figure 5:
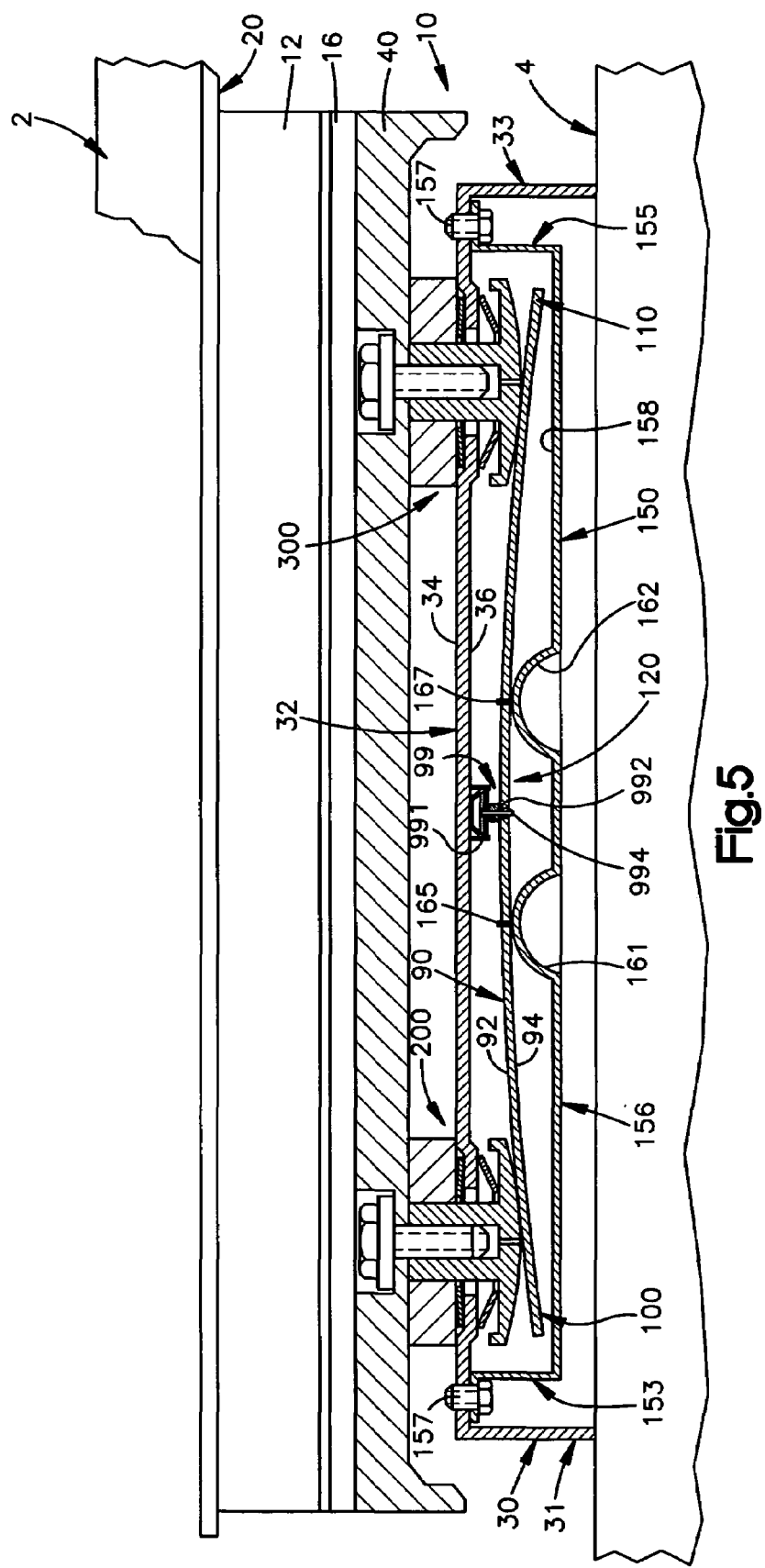
FIG. 5 is a schematic representation of the apparatus of FIG. 2 under a different condition.

The flanges 214, 314 force the first and second end portions 100, 110 of the lever 90 downward. The middle portion 120 of the lever 90, initially concave (FIG. 2), becomes more concave and deflects upward against the sensor assembly 99 (FIG. 5). If the load placed on the vehicle seat frame is not uniform, the first end portion 100 may move vertically downward more or less than the second end portion 110.

When an upward load is placed on the seat frame 20 (FIG. 6), the upper springs 240, 340, already compressed, expand against the spacers 230, 330 and the bracket 30. The lower springs 250, 350 further compress against the bracket 30 and the flanges 214, 314 of the threaded sleeves 210, 310. The vehicle seat frame 20 thus is displaced upward. The flanges 214, 314 of the threaded sleeves 210, 310 engage the lower surface 36 of the bracket 30 to provide a limit on upward movement of the vehicle seat frame 20.

Figure 6:
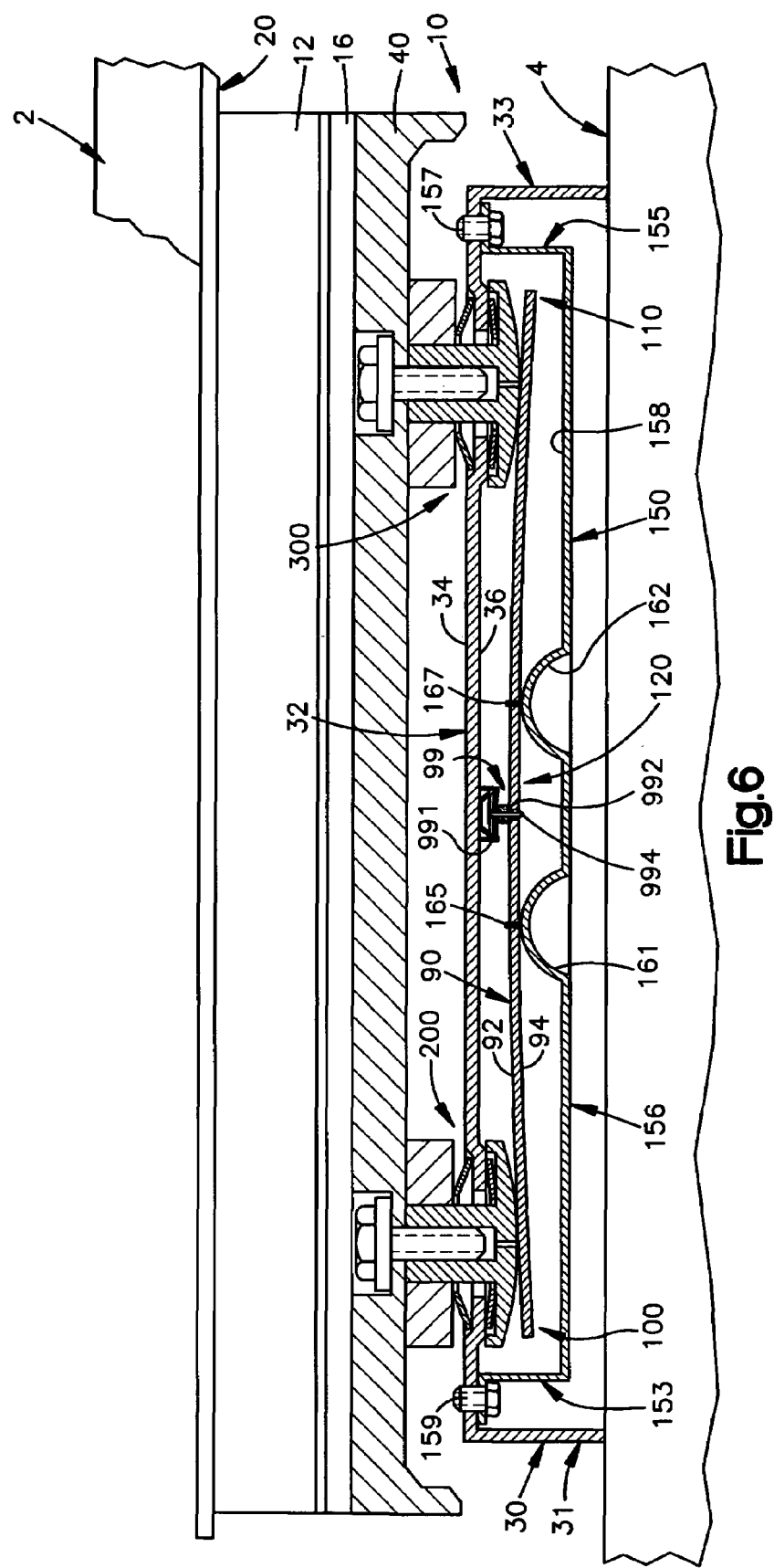
FIG. 6 is a schematic representation of the apparatus of FIG. 2 under another different condition.

The flanges 214, 314 allow the first and second end portions 100, 110 of the prestressed lever 90 to move upward. The middle portion 120 of the lever 90, initially concave (FIG. 2), becomes less concave and deflects downward away from the sensor assembly 99 (FIG. 6). If the load placed on the vehicle seat frame 20 is not uniform, the first end portion 100 may move vertically upward more or less than the second end portion 110.

The two point support arrangement of the two cylindrical portions 161, 162 of the carrier member 150 allows two unequal loads at the corners of the vehicle seat frame 20 to produced a combined, or averaged, amount of deflection at the sensor assembly 99. A single sensor 992 thus produces a single signal for the load on one side of the vehicle seat frame 20 at a front corner of the vehicle seat 2 and a back corner of the vehicle seat (FIG. 1). This is a more economical arrangement than conventional arrangements (i.e., two sensors instead of four, only two signals to process, etc.). Also, the springs 240, 250, 340, 350 protect the sensor 991 from large dynamic loads, upward or downward, on the vehicle seat frame 20 by dampening these loads.

Any initial stresses incurred by the sensor 992 due to prestressing of the lever or manufacturing/assembly tolerances (i.e., tightening of the fastener, etc.) may be factored out during an initial calibration of the sensor. The lever 90 essentially bends only in a vertical plane about two horizontal axes (as viewed in the Figs.). Torsional and lateral stresses to the lever 90 are mitigated by the cylindrical portions 161, 162 of the carrier member 150 and the spherical surfaces 216, 316 of the flanges 214, 314 of the spring assemblies 200, 300.

The sensor 991 produces an output signal directly proportional to the vertical force applied to the seat frame via the vehicle seat (i.e., the weight of the vehicle occupant, a load incurred during a vehicle collision, etc.). The sensor 991 may be any suitable sensor.

The apparatus 10 may be placed at each side of a rectangular seat frame (FIG. 1) thereby generating multiple signals. A wire harness 380 may transmit the output signals from the apparatuses 10 to an electrical controller 400.

The sensor 992 may be electrically connected to the controller 400 by the wire harness 380 running to connector plugs mounted on the sensors 992. The controller 400 processes the signals from the apparatuses 10 at each side of the vehicle seat 2 and generates an output signal indicative of the load on the vehicle seat frame 20. The multiple signals also can be analyzed by the controller 400 to produce output signals for controlling occupant protection devices, such as an air bags, seat belt pretensioners, etc.

A seat belt assembly (not shown) may also be associated with the vehicle seat. The seat belt assembly would include a seat belt retractor, mounted for example to the vehicle floor pan, and a seat belt buckle connected to the bracket. The seat belt would extend from the retractor to the buckle across a vehicle occupant in the seat.

From the above description of the invention, those skilled in the art will perceive improvements, changes and modifications. For example, the apparatus 10 may be placed above the upper and lower tracks with the lower track attaching directly to the vehicle floor pan. Such improvements, changes and modifications are intended to be included within the scope of the appended claims.

Having described the invention, the following is claimed:

1. An apparatus for use in a vehicle having a seat for a vehicle occupant and a vehicle floor pan supporting the vehicle seat, said apparatus comprising:
   a vehicle seat frame for supporting a load of the vehicle occupant in the vehicle seat;
   a bracket transmitting the load of the vehicle occupant in the vehicle seat from said vehicle seat frame to the vehicle floor pan;
   a spring compressing and allowing said vehicle seat frame to move vertically when the load of the vehicle occupant acts on the vehicle seat;
   a lever having a first end portion and a second end portion opposite said first end portion, said first end portion being movable with said vehicle seat frame, said second end portion being movable with said vehicle seat frame, said lever having a middle portion interposed between said first end portion and said econd end portion, said lever bending as said seat frame moves vertically relative to said bracket; and
   a sensor detecting movement of said middle portion of said lever and providing an output signal indicative of the amount of movement of said middle portion of said lever.

2. The apparatus as defined in claim 1 further including an upper track fixedly connected to said vehicle seat frame, said upper track engaging a lower track and being movable on said lower track for adjusting the vehicle seat for occupants of varying sizes.

3. The apparatus as defined in claim 1 further including a threaded sleeve for securing said bracket and said spring together.

4. The apparatus as defined in claim 1 wherein further including a carrier member for supporting said lever, said carrier member having a first cylindrical engagement surface engaging a lower surface of said lever and a second cylindrical engagement surface engaging said lower surface of said lever.

5. The apparatus as define in claim 1 further including a threaded sleeve for securing said bracket and said spring together, said threaded sleeve having a spherical surface for engaging said first end portion of said lever.

6. The apparatus as defined in claim 1 wherein said bracket includes a first end portion, a second end portion opposite said first end portion, and a horizontal middle portion for supporting said spring.

7. The apparatus as defined in claim 1 further including a fastener for prestressing said spring into a compressed condition.

8. The apparatus as defined in claim 1 further including a carrier member secured to said bracket.

9. The apparatus as defined in claim 1 wherein said lever is prestressed to a bent condition when no load is placed on the vehicle seat frame by a vehicle occupant in the vehicle seat.

10. The apparatus as defined in claim 1 wherein said spring is compressible as said seat frame moves downward and expandable as said seat frame moves upward.

11. An apparatus for use in a vehicle having a seat for a vehicle occupant and a vehicle floor pan supporting the vehicle seat, said apparatus comprising:
a bracket transmitting the load of the vehicle occupant in the vehicle seat to the vehicle floor pan;
a spring compressing and allowing the vehicle seat to move vertically when the load of the vehicle occupant acts on the vehicle seat;
a lever having a first end portion and a second end portion opposite said first end portion, said first end portion being movable with the vehicle seat, said second end portion being movable with the vehicle seat, said lever having a middle portion interposed between said first end portion and said second end portion, said lever bending as the vehicle seat moves vertically relative to said bracket; and
a sensor detecting movement of said middle portion of said lever and providing an output signal indicative of the amount of movement of said middle portion of said lever.

12. The apparatus as defined in claim 11 wherein said spring is compressible as the vehicle seat moves upward and expandable as said seat frame moves downward.

13. The apparatus as defined in claim 11 wherein said bracket includes a first end portion, a second end portion, and a horizontal portion interposed between said first end portion and said second end portion, said horizontal portion supporting said spring.

14. The apparatus as defined in claim 13 wherein said first and second end portions of said bracket support said lever.

15. The apparatus as defined in claim 11 further including a carrier member having a first cylindrical engagement surface engaging a lower surface of said lever.

16. An apparatus for use in a vehicle having a seat for a vehicle occupant and a vehicle floor pan supporting the vehicle seat, said apparatus comprising:
a vehicle seat frame supporting a load of the vehicle occupant in the vehicle seat;
a spring compressing and allowing said vehicle seat frame to move vertically when the load of the vehicle occupant acts on the vehicle seat;
a lever having a first end portion and a second end portion opposite said first end portion, said first end portion being movable with said vehicle seat frame, said second end portion being movable with said vehicle seat frame, said lever having a middle portion interposed between said first end portion and said second end portion, said lever bending as said vehicle seat frame moves vertically relative to the vehicle floor pan; and
a sensor detecting movement of said middle portion of said lever and providing an output signal indicative of the amount of movement of said middle portion of said lever.

17. The apparatus as defined in claim 16 further including a bracket for transmitting the load of the vehicle occupant in the vehicle seat to vehicle floor pan.

18. The apparatus as defined in claim 16 wherein said spring is compressible as said vehicle seat frame moves downward and expandable as said vehicle seat frame moves upward.

19. The apparatus as defined in claim 16 wherein said spring is compressible as said vehicle seat frame moves upward and expandable as said vehicle seat frame moves downward.

20. The apparatus as defined in claim 16 further including a carrier member for supporting said lever at two separate points interposed between said first end portion and said second end portion.

* * * * *